US 7,191,408 B2

(12) United States Patent
Yoshimura

(10) Patent No.: US 7,191,408 B2
(45) Date of Patent: Mar. 13, 2007

(54) DISPLAY CONTROL SYSTEM TO VIEW INTENDED PAGES

(75) Inventor: Kazuya Yoshimura, Hyogo (JP)

(73) Assignee: Quin Land Co., Ltd., Hyogo (JP)

( * ) Notice: Subject to any disclaimer, the term of this patent is extended or adjusted under 35 U.S.C. 154(b) by 801 days.

(21) Appl. No.: 10/258,373

(22) PCT Filed: Apr. 20, 2001

(86) PCT No.: PCT/JP01/03425

§ 371 (c)(1),
(2), (4) Date: Feb. 20, 2003

(87) PCT Pub. No.: WO01/84291

PCT Pub. Date: Nov. 8, 2001

(65) Prior Publication Data

US 2004/0004628 A1     Jan. 8, 2004

(30) Foreign Application Priority Data

Apr. 27, 2000  (JP) ............................ 2000-127375

(51) Int. Cl.
*G06F 3/00* (2006.01)
*G06F 9/00* (2006.01)
*G06F 17/00* (2006.01)

(52) U.S. Cl. ............... 715/823; 715/811; 715/762; 715/763; 715/764

(58) Field of Classification Search ............... 715/823, 715/811, 762, 763, 764
See application file for complete search history.

(56) References Cited

U.S. PATENT DOCUMENTS

| 5,241,655 | A | * | 8/1993 | Mineki et al. | 715/835 |
| 5,550,969 | A | * | 8/1996 | Torres et al. | 715/787 |
| 6,040,829 | A | * | 3/2000 | Croy et al. | 715/864 |
| 6,219,665 | B1 | * | 4/2001 | Shiomi | 707/6 |
| 6,249,773 | B1 | * | 6/2001 | Allard et al. | 705/26 |
| 6,351,599 | B1 | * | 2/2002 | Komeno | 386/70 |
| 6,580,442 | B1 | * | 6/2003 | Singh et al. | 715/840 |

FOREIGN PATENT DOCUMENTS

| JP | 06-243166 | 9/1994 |
| JP | 07-021066 | 1/1995 |

(Continued)

*Primary Examiner*—Raymond J. Bayerl
*Assistant Examiner*—Anita Datta Chaudhuri
(74) *Attorney, Agent, or Firm*—Hogan & Hartson LLP

(57) ABSTRACT

A display control system for easy viewing of intended information. A display control means of a server computer controls, when the cursor of a display means of a personal computer is brought to one of plural items of information constituting a second group of items of information displayed on the second display area of the display means to assume that an information choice instruction is given and, according to the information choice instruction, to choose one of plural items of information constituting the second group of information, to choose on the basis of a relation table one or more items of information constituting a first group of items of information related to the one item of information chosen from the second group of items of information, and to attach a choice mark to the items of information chosen out of the items of information displayed on the first display area.

14 Claims, 14 Drawing Sheets

FOREIGN PATENT DOCUMENTS

| | | |
|---|---|---|
| JP | 09-120353 | 5/1997 |
| JP | 09-326970 | 12/1997 |
| JP | 10-063463 | 3/1998 |
| JP | 10-171755 | 6/1998 |
| JP | 11-212698 | 8/1999 |
| JP | 11-212699 | 8/1999 |
| JP | 2000-075851 | 3/2000 |
| WO | 01/84290 | 11/2001 |

* cited by examiner

| THEME ID | THEME |
|---|---|
| T 1 | WANT TO SELL A CAR. |
| T 2 | WANT TO BUY A USED CAR. |
| T 3 | WANT TO BUY A NEW CAR. |
| T 4 | WANT TO DRESS UP. |
| T 5 | ACCIDENT/TROUBLE. |
| T 6 | INSURANCE/LOAN/LEASE |

Fig. 8

| | PUPU MASTER<br>PUPU MASTER'S ADVICE | PUPU COMMUNITY<br>SOCIAL REPUTATION | PUPU DATABASE<br>CAR DATA INFORMATION |
|---|---|---|---|
| | ●YOUR RELIABLE AGENT<br>· USEFUL INFORMATION FOR YOUR COMFORTABLE CAR LIFE<br>· GET A PIECE OF MASTER'S ADVICE WHEN YOU ARE IN NEED<br>· AGENT FOR SOMEONE BUSY | ●FULL OF USERS' VOICES<br>· LATEST NEWS ABOUT CARS<br>· INFORMATION POSTED BY READERS<br>· TROUBLESHOOTING Q&A | ●FULL OF INFORMATION ABOUT EVERY TYPE OF CAR<br>· YOU'LL KNOW IT WHEN YOU SEE IT! DATA CATALOG OF ALL TYPES OF CARS<br>· ALL DATA ON AERO PARTS, ALUMINUM PARTS AND CAR ACCESSORIES<br>· EXTENDED SEARCH AVAILABLE ON SELLING, REPAIR AND CAR INSPECTION! |
| | SELL MY CAR AT A HIGH PRICE | BUSINESS CIRCLE NEWS | |
| | BUY A NEW CAR AT A LOW PRICE | INFORMATION ABOUT DISCOUNT ON NEW CARS | |
| | BUY A USED CAR WISELY | READERS' EXPERIENCES | NEW CAR INFORMATION |
| · WANT TO SELL MY CAR | CHOOSE REPAIR AND CAR INSPECTION WISELY | ├ SOLD MY CAR AT A HIGH PRICE | USED CAR INFORMATION |
| · WANT TO BUY A USED CAR | MAKE THE BEST CHOICE OF CUSTOM PARTS | ├ BOUGHT A NEW CAR AT A LOW PRICE | COMPARISON-OF-CARS INFORMATION |
| · WANT TO BUY A NEW CAR | CAR INSURANCE AND TRAFFIC ACCIDENT | ├ BOUGHT A USED CAR AT A LOW PRICE | CAR PURCHASE INFORMATION |
| · WANT TO ADD CUSTOM PARTS | UTILIZE LEASE AND LOAN WISELY | ├ GOT MY CAR BEST DRESSED | CAR ACCESSORIES |
| · ACCIDENT/ BREAKDOWN<br>· INSURANCE/LOAN/ LEASE | CHOOSE AV AND NAVIGATION WISELY | ├ WHAT I LEARNED FROM CAR ACCIDENT /REPAIR/INSURANCE | CAR INSPECTION/ REPAIR |
| | EXAMPLES OF HOW TO USE PUPU MASTER | WHAT I'M PROUD OF ABOUT MY CAR | INSURANCE COMPANIES |
| | | PERSONAL TRANSACTION | |
| | | RANKING | |
| | | ACCIDENT/BREAKDOWN /INSURANCE | |
| | | TEST DRIVE IMPRESSION | |
| | | PUPU MASTER'S COMMENTARY | |
| | | ├ SELL A CAR AT A HIGH PRICE | |
| | | ├ BUY A NEW CAR AT A LOW PRICE | |
| | | ├ BUY A USED CAR WISELY | |
| | | ├ CHOOSE CAR INSPECTION AND MAINTENANCE WISELY | |
| | | ├ CAR INSURANCE AND TRAFFIC ACCIDENT | |

|_____26_____|_____32_____|_____34_____|_____36_____|
|_____24_____|

Fig.9

| | PUPU MASTER — PUPU MASTER'S ADVICE | PUPU COMMUNITY — SOCIAL REPUTATION | PUPU DATABASE — CAR DATA INFORMATION |
|---|---|---|---|
| | ●YOUR RELIABLE AGENT<br>• USEFUL INFORMATION FOR YOUR COMFORTABLE CAR LIFE<br>• GET A PIECE OF MASTER'S ADVICE WHEN YOU ARE IN NEED<br>• AGENT FOR SOMEONE BUSY | ●FULL OF USERS' VOICES<br>• LATEST NEWS ABOUT CARS<br>• INFORMATION POSTED BY READERS<br>• TROUBLESHOOTING Q&A | ●FULL OF INFORMATION ABOUT EVERY TYPE OF CAR<br>• YOU'LL KNOW IT WHEN YOU SEE IT! DATA CATALOG OF ALL TYPES OF CARS<br>• ALL DATA ON AERO PARTS, ALUMINUM PARTS AND CAR ACCESSORIES<br>• EXTENDED SEARCH AVAILABLE ON SELLING, REPAIR AND CAR INSPECTION! |
| • WANT TO SELL MY CAR<br>• WANT TO BUY A USED CAR<br>• WANT TO BUY A NEW CAR<br>• WANT TO ADD CUSTOM PARTS<br>• ACCIDENT/ BREAKDOWN<br>• INSURANCE/LOAN/ LEASE | SELL MY CAR AT A HIGH PRICE | BUSINESS CIRCLE NEWS | |
| | BUY A NEW CAR AT A LOW PRICE | INFORMATION ABOUT DISCOUNT ON NEW CARS | |
| | BUY A USED CAR WISELY | READERS' EXPERIENCES | NEW CAR INFORMATION |
| | CHOOSE REPAIR AND CAR INSPECTION WISELY | SOLD MY CAR AT A HIGH PRICE | USED CAR INFORMATION |
| | MAKE THE BEST CHOICE OF CUSTOM PARTS | BOUGHT A NEW CAR AT A LOW PRICE | COMPARISON-OF-CARS INFORMATION |
| | CAR INSURANCE AND TRAFFIC ACCIDENT | BOUGHT A USED CAR AT A LOW PRICE | CAR PURCHASE INFORMATION |
| | UTILIZE LEASE AND LOAN WISELY | GOT MY CAR BEST DRESSED | CAR ACCESSORIES |
| | CHOOSE AV AND NAVIGATION WISELY | WHAT I LEARNED FROM CAR ACCIDENT /REPAIR/INSURANCE | CAR INSPECTION/ REPAIR |
| | EXAMPLES OF HOW TO USE PUPU MASTER | WHAT I'M PROUD OF ABOUT MY CAR | INSURANCE COMPANIES |
| | | PERSONAL TRANSACTION | |
| | | RANKING | |
| | | ACCIDENT/BREAKDOWN /INSURANCE | |
| | | TEST DRIVE IMPRESSION | |
| | | PUPU MASTER'S COMMENTARY — 38 | |
| | | SELL A CAR AT A HIGH PRICE | |
| | | BUY A NEW CAR AT A LOW PRICE | |
| | | BUY A USED CAR WISELY | |
| | | CHOOSE CAR INSPECTION AND MAINTENANCE WISELY | |
| | | CAR INSURANCE AND TRAFFIC ACCIDENT | |
| 26 | 32 | 34 | 36 |

INFORMATION ABOUT DISCOUNT ON NEW CARS

READERS' EXPERIENCES

WHAT I'M PROUD OF ABOUT MY CAR

PERSONAL TRANSACTION

RANKING

ACCIDENT/BREAKDOWN/INSURANCE

TEST DRIVE IMPRESSION

USED CAR INFORMATION

COMPARISON-OF-CARS INFORMATION

CAR PURCHASE INFORMATION

CAR ACCESSORIES

CAR INSPECTION/REPAIR

INSURANCE COMPANIES

:
:
:
:
:

} 92

DISPLAY CONTROL SYSTEM TO VIEW INTENDED PAGES

REFERENCE TO RELATED APPLICATIONS

The entire disclosure of a Japanese Patent Application No. 2000-127375 filed on Apr. 27, 2000 including its specification, claims, drawings, and summary are incorporated herein by reference in its entirety.

TECHNICAL FIELD

The present invention relates to a display control system, a display control device, and a display control method, and in particular relates to a technique of controlling a display device for displaying information according to an information choice instruction entered.

BACKGROUND ART

Versatile pieces of information may be provided using Web pages provided through the Internet. FIG. 14 shows part of a conventional Web page, an example related to the information on cars.

The conventional Web page is arranged to display an information index table 92 on the display screen of a user's computer (not shown). When the user clicks any index displayed, details (not shown) of the indexed information are displayed. The user may find an appropriate index from the table 92 and click the index to get further information.

However, the conventional Web pages have a problem. In the case of FIG. 14 for example, the user may not know which index to click when the user wants to sell his or her own car. In particular when the user is not so familiar with cars, it is hard to determine an appropriate index when there are a large number of indices.

DISCLOSURE OF THE INVENTION

The object of the present invention is to provided a display control system, etc. that solves the above problem associated with the conventional Web pages, etc. and that makes it possible to view easily intended information.

A display control system according the present invention comprising:

an input means through which an information choice instruction is entered, a display means for displaying information, a display control means for controlling the display means to display information according to the information choice instruction entered through the input means, and a memory means for storing plural items of information constituting a first group of items of information, wherein the display control means controls to read plural items of information constituting the first group of items of information from the memory means, to simultaneously display the read items of information on a first display area of the display means, to choose one or more items of information constituting a first group of information according to the information choice instruction entered through the input means, and to attach a choice mark to the items of information chosen out of the items of information displayed on the first display area.

A display control system according to the present invention comprising:

an input means through which information choice instruction is entered, a display means for displaying information, a display control means for controlling the display means to display information according to the information choice instruction entered through the input means, and a memory means for storing plural items of information constituting a first group of items of information, wherein the display control means controls to choose one or more items of information constituting the first group of items of information according to the information choice instruction entered through the input means, to read the one or more items of information chosen from the memory means, and to display them in the order of specified display priority degrees on the first display area of the display means.

A display control device according to the present invention, for controlling to display information using a display means according to an information choice instruction entered through an input means, comprising:

a memory means for storing plural items of information constituting a first group of items of information, and a display control means for controlling to read from the memory means plural items of information constituting the first group of items of information, to display the items of information simultaneously on a first display area of the display means, to choose one or more items of information constituting the first group of items of information according to the information choice instruction entered through the input means, and to attach a choice mark to the items of information chosen out of the items of information displayed on the first display area.

A display control device according to the present invention, for controlling to display information using a display means according to an information choice instruction entered through an input means, comprising:

a memory means for storing plural items of information constituting a first group of items of information, and a display control means for controlling to choose one or more items of information constituting a first group of items of information according to an information choice instruction entered through the input means, to read the one or more items of information chosen from the memory means, and to display them in the order of specified display priority degrees on a first display area of the display means.

A recording medium on which is recorded a program according to the present invention, the program for causing a computer system, made up of an input means for entering an information choice instruction, a display means for displaying information, and a memory means for storing plural items of information constituting a first group of items of information, to perform controlling process of displaying information on a display means according to the information choice instruction entered through the input means, wherein the controlling process comprising the steps of: reading from a memory means plural items of information constituting the first group of items of information, displaying the information simultaneously on a first display area of the display means, choosing one or more items of information constituting the first group of items of information according to the information choice instruction entered through the input means, and attaching a choice mark to the items of information chosen out of the items of information displayed on the first display area.

A recording medium on which is recorded a program according to the present invention, the program for causing a computer system, made up of an input means for entering an information choice instruction, a display means for displaying information, and a memory means for storing plural items of information constituting a first group of items of information, to perform controlling process of displaying information on a display means according to an information choice instruction entered through the input means, wherein the controlling process comprising the steps of: choosing one or more items of information constituting the first group of information according to the information choice instruction entered through the input means, reading the one or more items of information chosen from the memory means, and displaying in the order of specified display priority degrees on a first display area of the display means.

A display control method according to the present invention for controlling to display information on a display means according to an information choice instruction entered, arranged for controlling to store and hold plural items of information constituting a first group of items of information, to read the plural items of information constituting the first group of information stored and held, to display the items of information simultaneously on a first display area of the display device, to choose one or more items of information constituting the first group of items of information according to the information choice instruction entered, and to attach a choice mark to the items of information chosen out of the items of information displayed on the first display area.

A display control method according to the present invention for controlling to display information on a display means according to an information choice instruction entered, arranged for controlling to store and hold plural items of information constituting a first group of items of information, to choose one or more items of information constituting the first group of items of information according to the information choice instruction entered, and to display the chosen one or more items of information in the order of specified display priority degrees on a first display area of the display means.

While the features of the present invention may be broadly shown as the above, the constitution and contents of the invention, together with its object and detailed features, will become more apparent by way of the following disclosure in reference to the appended drawings.

BRIEF DESCRIPTION OF THE DRAWINGS

FIG. 8 shows an example image displayed on the CRT 64 of the personal computer 6 in the choice mark displaying process.

FIG. 9 shows an example image displayed on the CRT 64 of the personal computer 6 in the choice mark displaying process.

FIG. 14 shows part of a conventional Web page.

BEST MODE FOR CARRYING OUT THE INVENTION

Figure 1:
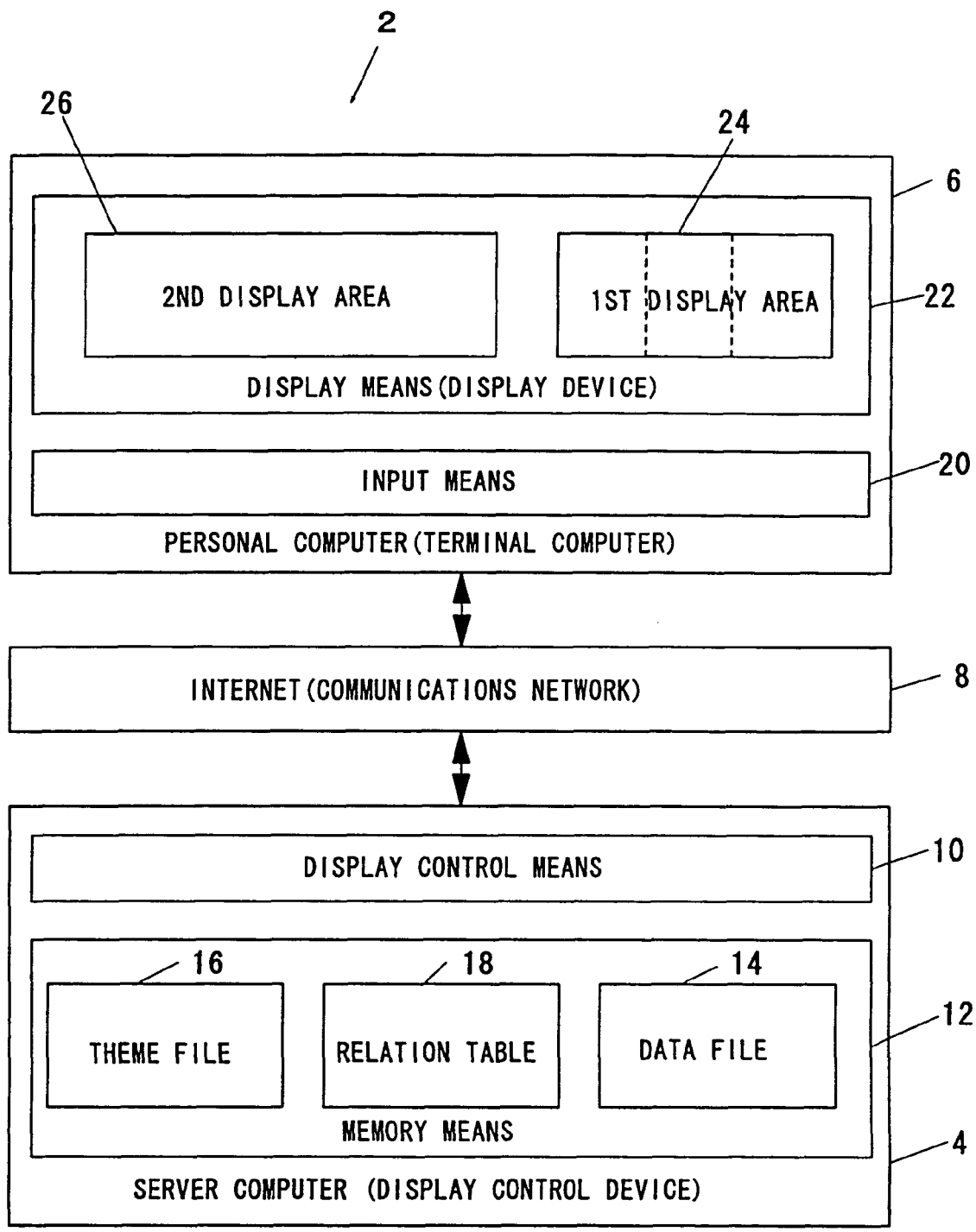
FIG. 1 is a block diagram for explaining the constitution of a display control system 2 as an embodiment of the present invention.

FIG. 1 is a block diagram for explaining the constitution of a display control system 2 as an embodiment of the present invention. The display control system 2 comprises a server computer (display control device) 4, and a personal computer 6 or a terminal computer communicable with the server computer 4 through a communications network, the Internet 8.

The server computer 4 comprises a display control means 10 and a memory means 12. In the memory means 12 are provided a data file 14, a theme file 16, and a relation table 18.

The personal computer 6 comprises an input means 20 and a display means (display device) 22. The display means 22 has a first display area 24 and a second display area 26. The display control system 2 shown in FIG. 1 is arranged to be connected to plural personal computers 6.

Information choice instructions are entered through the input means 20 of the personal computers 6. The display means 22 of the personal computers 6 displays information.

Figure 5:
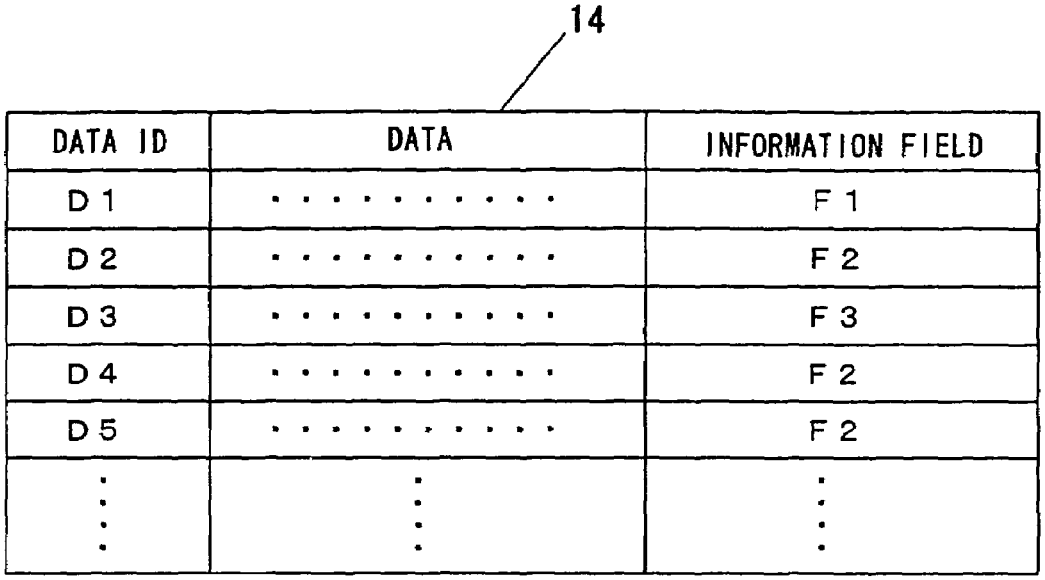
FIG. 5 shows an example of data constitution of a data file 14.

The data file (first file) 14 constituting the memory means 12 of the server computer 4 stores and holds items of information, that constitutes a first group of items of information or the data related the above-mentioned data, in a state ready for being divided into plural information fields (See FIG. 5).

Figure 6:
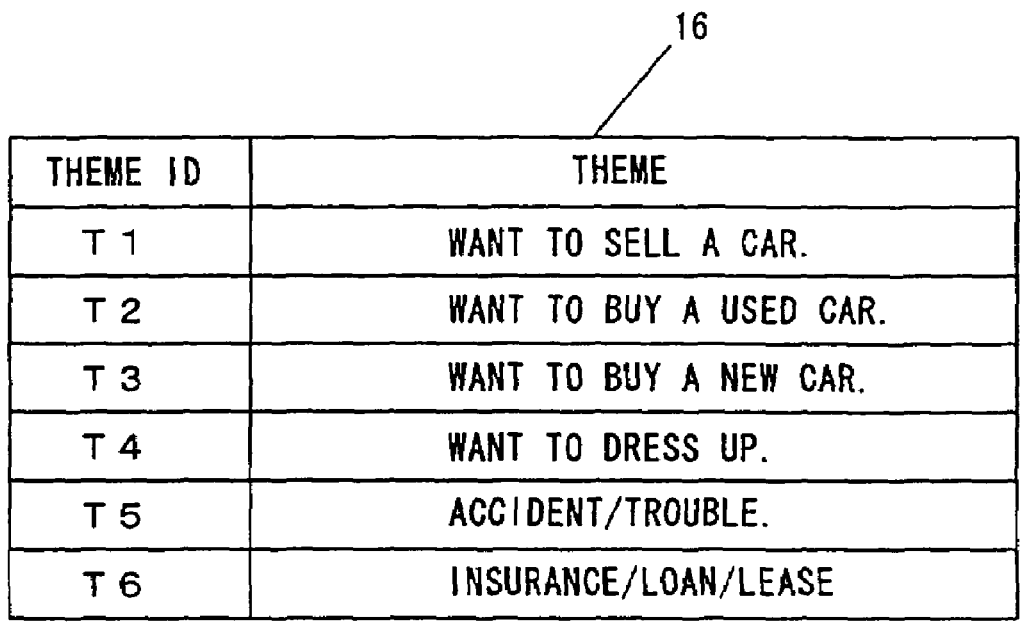
FIG. 6 shows an example of data constitution of a theme file 16.

Plural items of information or themes constituting the second group of items of information are stored in the theme file 16 (second file) (See FIG. 6).

The relation table 18 stores the corresponding relationship between plural items of data constituting the first group of items of information and plural themes constituting the second group of items of information. The relation table also stores the display priority degrees of the respective data, constituting the first group of items of information, on the first display area for respective themes constituting the second group of items of information (See FIG. 7).

The display control means 10 of the server computer 4 controls the display means 22 of the personal computer 6 through the Internet 8 to display information on the basis of information choice instruction entered through the input means 20 of the personal computer 6 and transmitted through the Internet 8.

To put it more in detail, the display control means 10 reads plural items of data constituting the first group of items of information from the data file 14 of the memory means 12 and simultaneously displays them through the Internet 8 on the first display area 24 of the display means 22 of the personal computer 6.

At this time, the display control means 10 controls to divide the first display area 24 of the display means 22 into plural areas 32, 34, 36 (FIG. 8) corresponding to plural fields of information, and to display data of corresponding fields of information or data related to the data of corresponding fields of information in the respective, divided areas.

The display control means 10 also reads plural themes constituting the second group of information from the theme file 16 of the memory means 12 and simultaneously displays them in the second display area 26 of the display means 22 of the personal computer 6 (See FIG. 8).

The display control means 10, when the cursor of the display means 22 is pointed to a theme, or a constituent of the second group of items of information displayed on the second display area 26 of the display means 22 of the personal computer 6, assumes the theme to have been chosen by an information choice instruction and controls to choose according to the information choice instruction one of plural themes constituting the second group of items of information, to choose one or more items of data constituting the first group of items of information related to the one theme chosen out of the second group of items of information on the basis of the relation table 18, and to attach a choice mark to those data chosen out of the data displayed on the first display area (See FIG. 9).

This embodiment is arranged to display the currently chosen choice mark until the cursor is pointed to a new theme in the second group of items of information.

Figure 11:
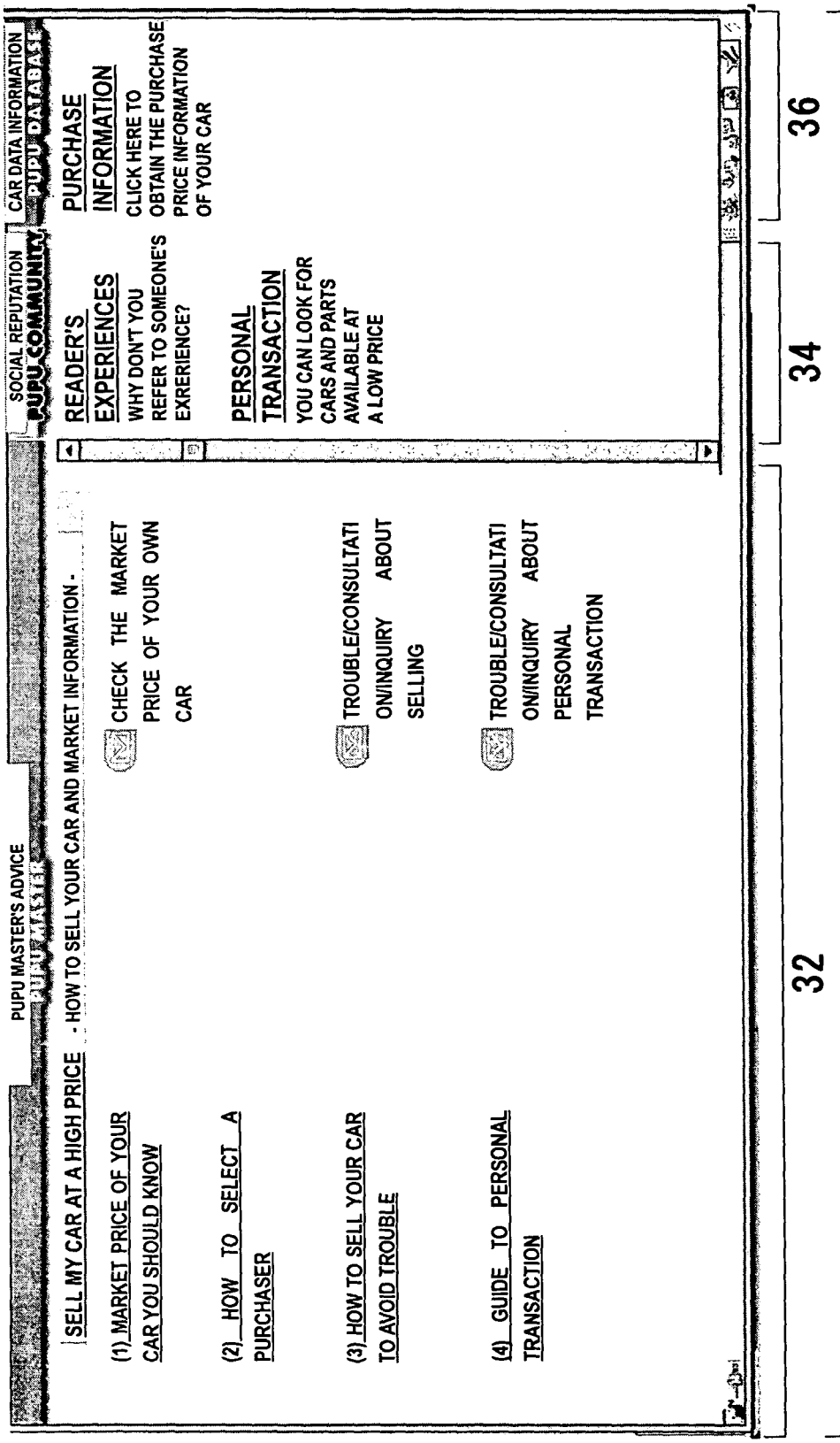
FIG. 11 shows an example image displayed on the CRT 64 of the personal computer 6 in the automatic editing process.

The display control means 10 also controls, when a theme, or a constituent of the second group of items of information displayed on the second display area of the display means 22 of the personal computer 6 is clicked, assumes the click to be an information choice instruction and controls to choose according to the information choice instruction one of plural themes constituting the second group of items of information, to choose one or more data constituting the first group of items of information related to the one theme chosen out of the second group of items of information on the basis of the relation table 18, and to display one or more items of data the chosen on the first display area 24 of the display means 22 (See FIG. 11).

At this time, the display control means 10 determines according to the relation table 18 the display priority degrees of one or more items of data constituting the first group of items of information corresponding to the one theme chosen out of the second group of items of information. This embodiment is arranged to display the data of higher degree of relation to a theme is displayed in a higher position on the first display area 24.

This embodiment is arranged that, when displaying the one or more items of data chosen on the first display area 24 of the display means 22, the first display area 24 is expanded over the area that has been the second display area 26, so that the second display area 26 temporarily disappears (See FIG. 11).

Figure 12:
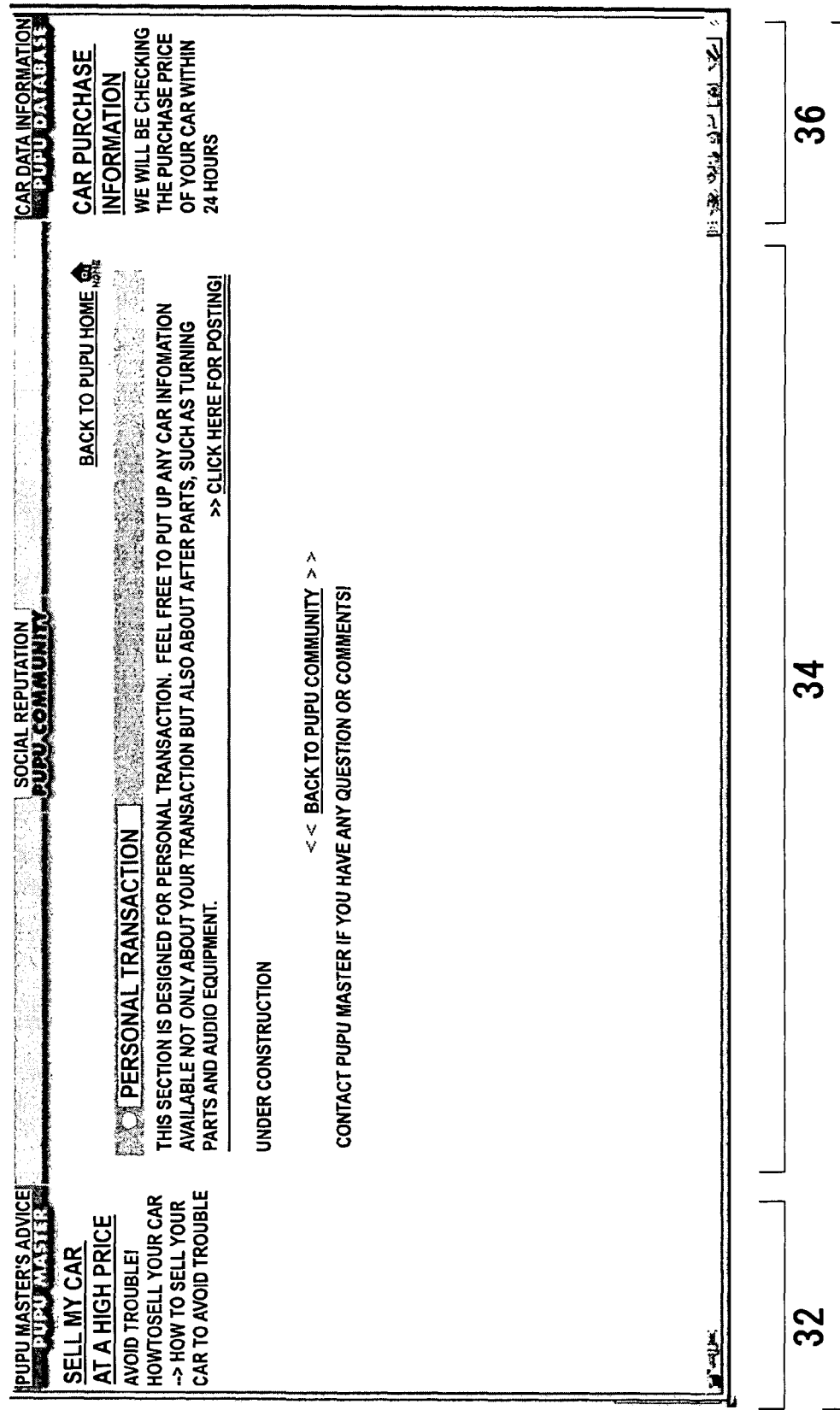
FIG. 12 shows an example image displayed on the CRT 64 of the personal computer 6 in the automatic editing process.

The display control means 10 also controls to display data, in a state to be chosen, in the plural divisions of the first display area 24, and, when a specific data displayed on the first display area 24 constituting the first group of items of information is chosen (clicked), data related to the chosen data are displayed (See FIG. 12).

At this time, the display control means 10 controls, if any data displayed on the first display area 24 is chosen (clicked), to make the display area size of the division area containing the chosen data (division area 34 in the example shown in FIG. 12) greater than that of other division areas (division areas 32, 36 in FIG. 12).

Figure 2:
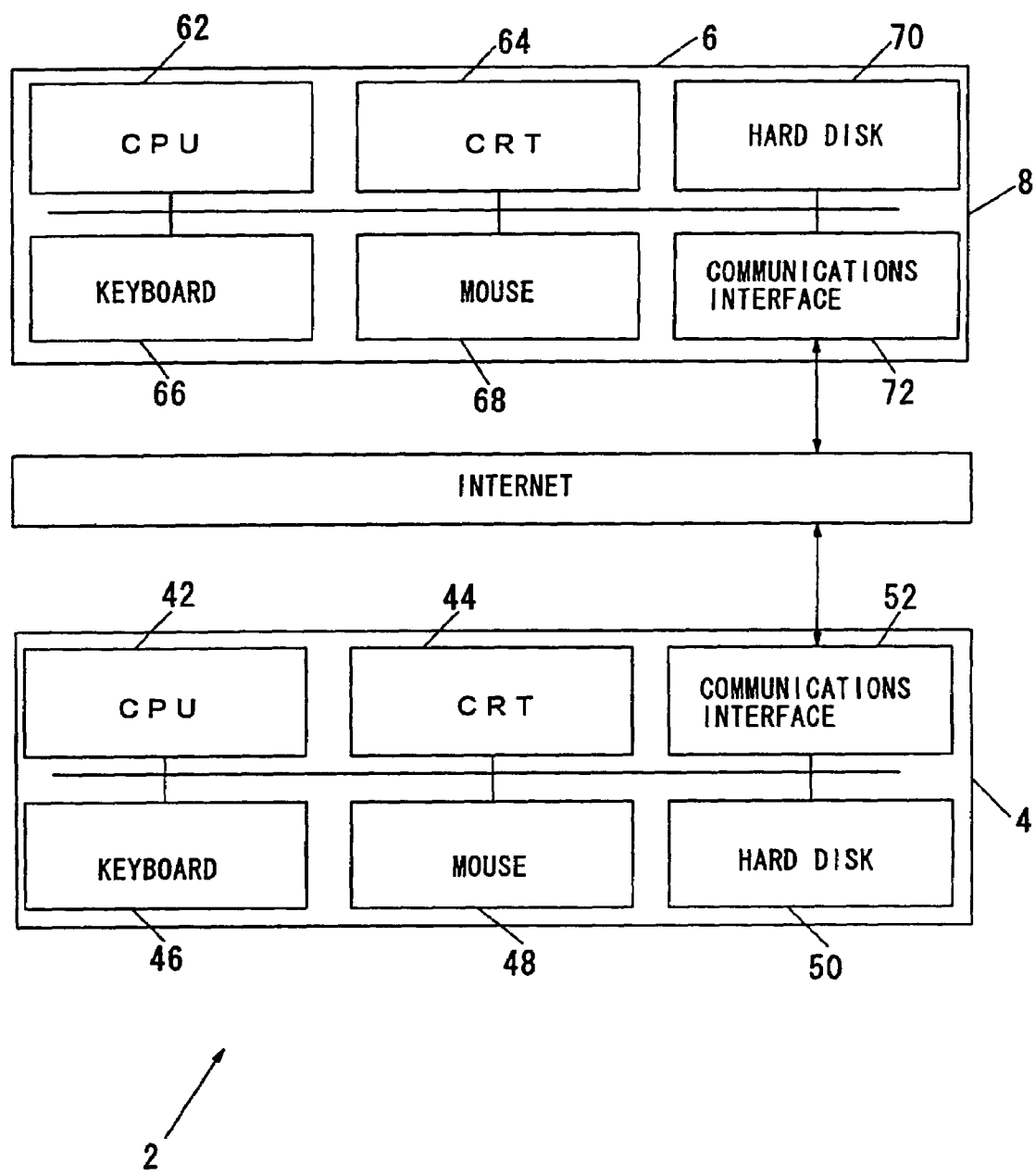
FIG. 2 shows an example of hardware constitution of the display control system 2 shown in FIG. 1 using a server computer 4 and a personal computer 6.

FIG. 2 shows an example of hardware constitution of the display control system 2 shown in FIG. 1 using a server computer 4 and a personal computer 6.

The server computer 4 comprises a hard disk 50 or a memory means or a memory medium having stored a program of the present system, a CPU 42 or a display control means for running the program stored in the hard disk 50, a CRT 44, a keyboard 46 and a mouse 48, and a communication interface 52 to communicate with the personal computer 6 through the Internet 8.

The hard disk 50 of the server computer 4 also has stored in addition to the above-mentioned program a data file 14, a theme file 16, and a relation table.

The personal computer 6 shown in FIG. 2 comprises a display means (display device) or a CRT 64, an input means or a keyboard 66 with a mouse 68, a recording medium or a hard disk 70 having recorded information viewing program (the information being exchanged through the Internet 8), a CPU 62 for running the program and the like stored on the hard disk 70, and a communication interface 72 to communicate with the server computer 4 through the Internet 8.

Figure 3:
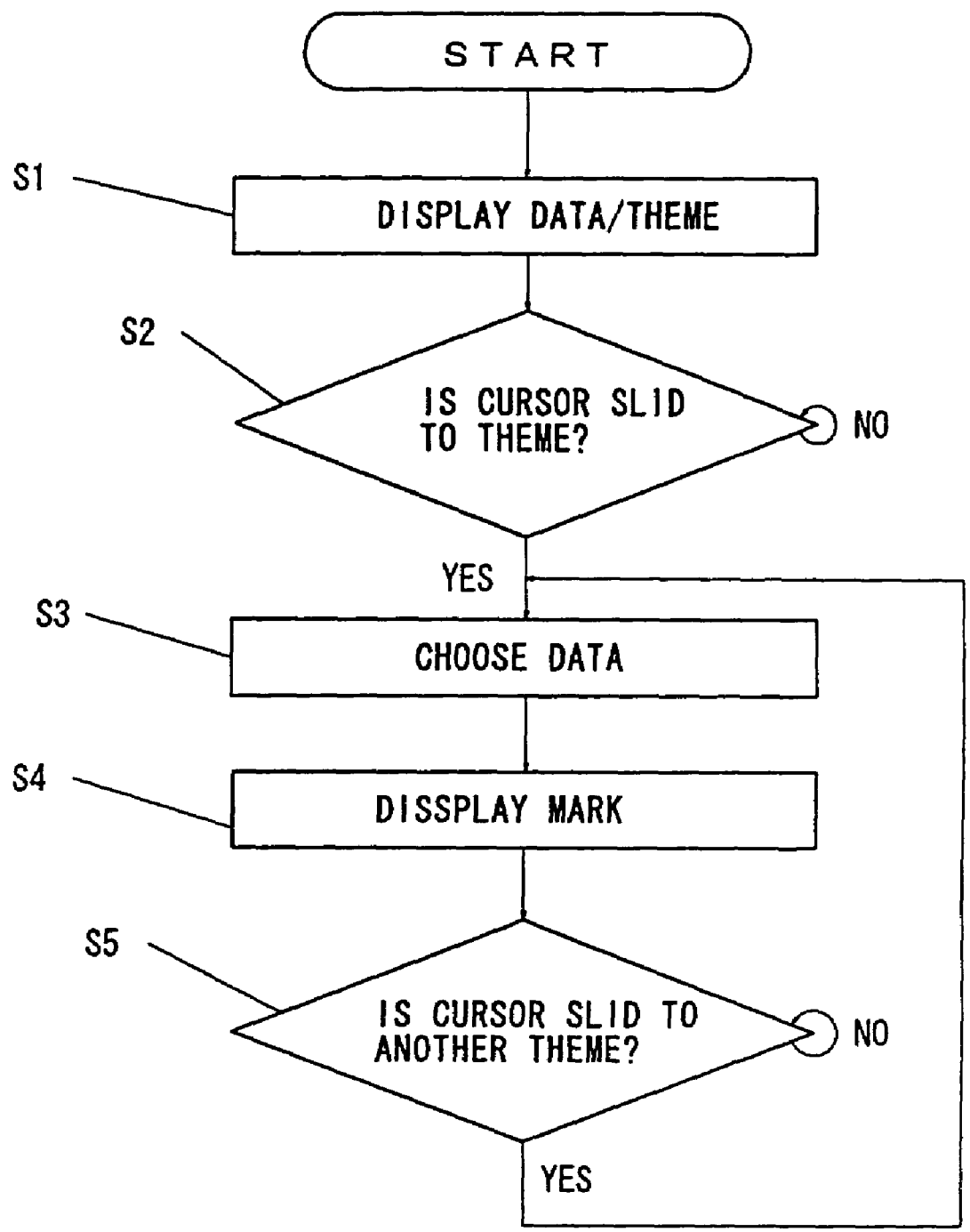
FIG. 3 is an example flowchart of a process of displaying a choice mark (a choice mark displaying process) on the first display area 24 on the CRT 64 of the personal computer 6 of the display control system 2.

FIG. 3 is an example flowchart of a process of displaying a choice mark on the first display area 24 on the CRT 64 (a choice mark displaying process) of the personal computer 6 of the display control system 2.

FIG. 5 shows an example of data constitution of the data file 14. The data file 14 stores data (indices and more detailed explanations) in a file form such as HTML to be displayed on the first display area 24 of the personal computer 6. Respective data are affixed with data IDs ('D1',) and with descriptions of information fields (F1, . . . ) to which the data belong.

FIG. 6 shows an example of data constitution of a theme file 16. The theme file 16 stores themes to be displayed on the second display area 26 of the personal computer 6 in a file form such as HTML. Respective themes are provided with theme IDs ('T1', . . . ).

Figure 7:
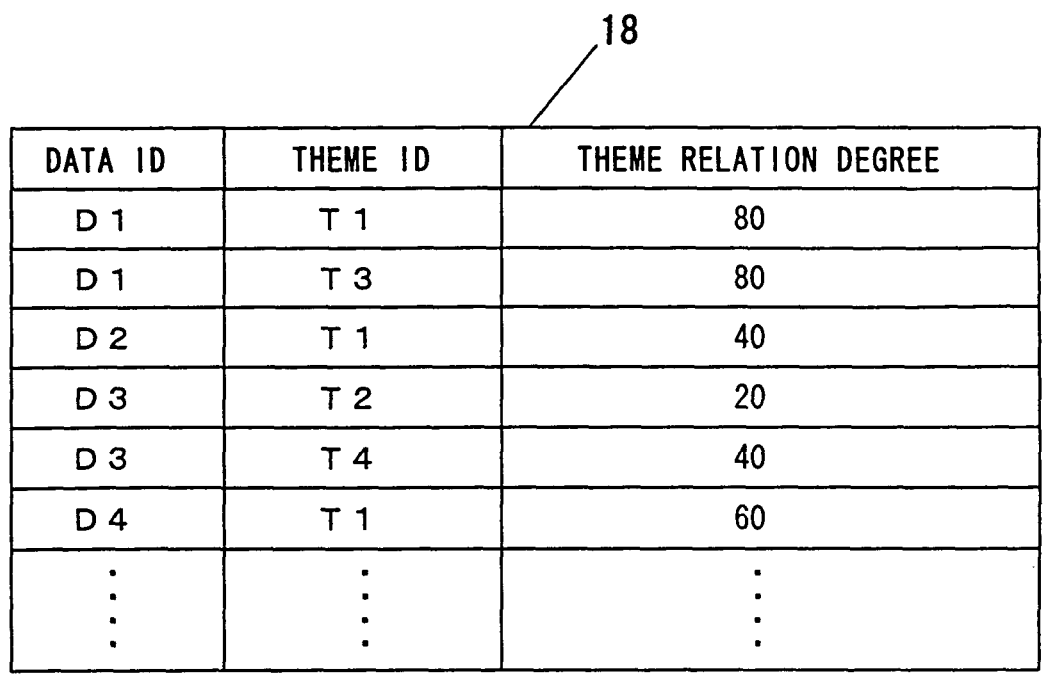
FIG. 7 shows an example of data constitution of a relation table 18.

FIG. 7 shows an example of data constitution of the relation table 18. In the relation table 18 is described relationship between the data to be displayed on the first display area 24 and the themes to be displayed on the second display area 26 of the personal computer 6. That is to say, the data IDs and the theme IDs are listed in corresponding relation with each other.

Besides, degrees of theme relation between the listed data IDs and the theme IDs are listed. This embodiment is arranged to give a higher numerical value to a higher data-to-theme relation.

Figure 10:
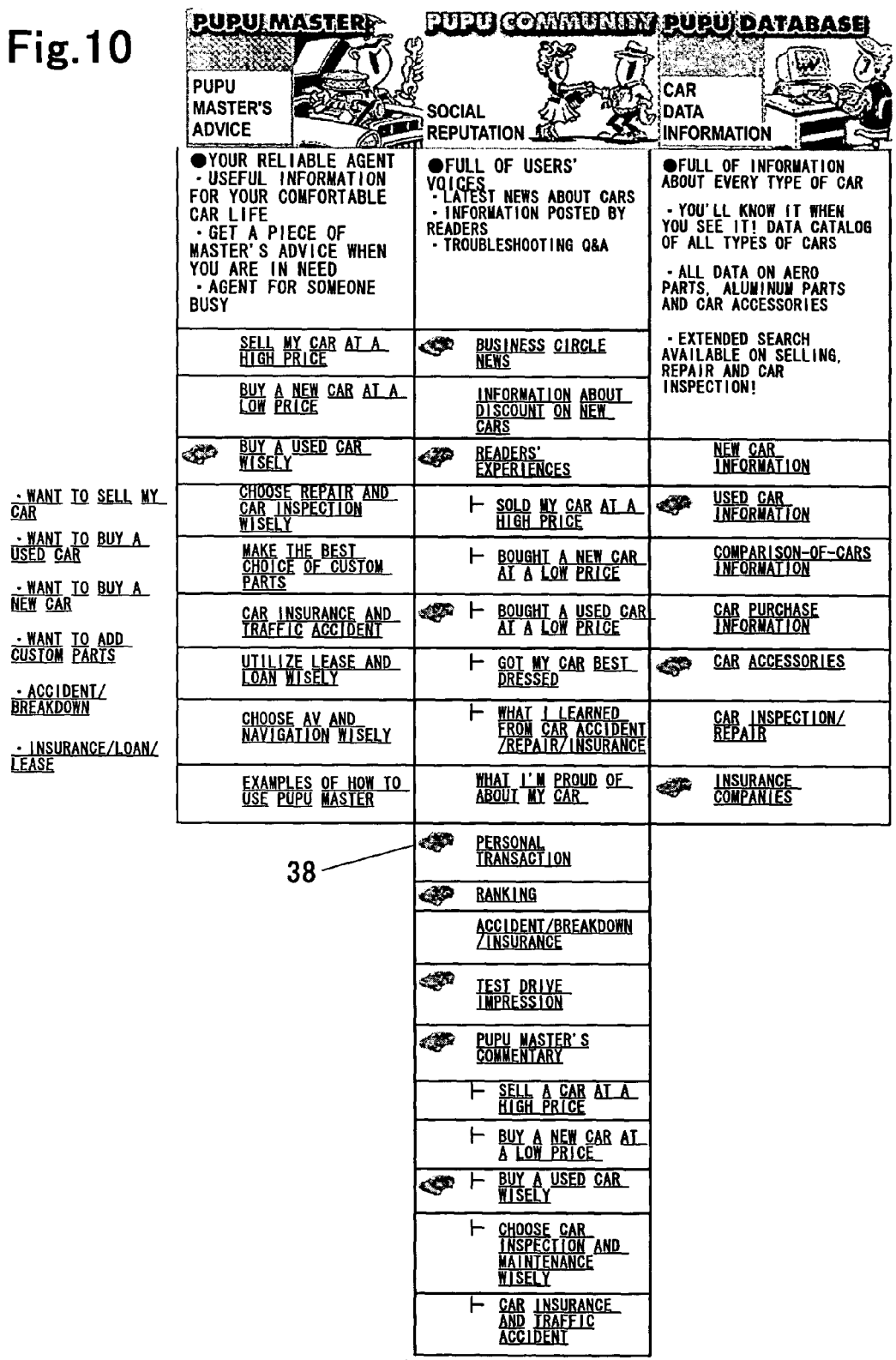
FIG. 10 shows an example image displayed on the CRT 64 of the personal computer 6 in the choice mark displaying process.

FIGS. 8 to 10 show examples of images displayed on the CRT 64 of the personal computer 6 in the choice mark displaying process.

The choice mark displaying process is described in reference to FIGS. 2, 3, 5 to 10. First, the CPU 42 of the server computer 4 reads themes (six themes in the example shown in FIG. 8), in a mode of information, from the theme file 16 stored in the hard disk 50 and shown in FIG. 6.

Likewise, the CPU 42 reads data, in another mode of information (data of many indices in the example shown in FIG. 8), from the data file 14 stored as shown in FIG. 5 in the hard disk 50.

Next, the CPU 42 controls to display the read theme and data representing indices (hereinafter simply referred to as "indices" as appropriate) respectively on the second display area 26 and the first display area 24 of the CRT 64 of the personal computer 6 through the Internet 8 (FIG. 3, step S1).

As shown in FIG. 8, six themes related to cars "want to sell my car," "want to buy a used car," . . . , "insurance/loan/lease" are displayed from top toward bottom in the second display area 26.

On the other hand, the first display area 24 is divided into three division areas 32, 34, and 36 arranged side by side. In the first division area 32 are displayed indices, belonging to an information field of advice on cars, such as "sell my car at a high price" (for example, corresponding to the information field F1 shown in FIG. 5).

In the second division area 34 are displayed indices belonging to an information field of social reputation about cars such as "business circle news," etc. (for example, corresponding to the information field F2 shown in FIG. 5). In the third division area 36 are displayed indices belonging to the information field of various data related to cars such as "new car information," etc (for example, corresponding to the information field F3 shown in FIG. 5).

Next, the CPU 42 of the server computer 4 monitors through the Internet 8 whether or not the cursor (not shown) is pointed to one of the themes displayed on the second display area 26 of the CRT 64 of the personal computer 6 (FIG. 3, step S2).

If a user of the personal computer 64 brings the cursor to one of the themes, such as "want to sell my car" (theme ID 'T1'), this information is transmitted through the Internet 8 to the server computer 4.

The CPU 42 of the server computer 4, based on the information transmitted, searches through the relation table 18 shown in FIG. 7, and chooses indices ('D1', 'D2', 'D4', . . . ) provided with the theme 'T1' (FIG. 3, step S3).

The CPU 42 of the server computer 4 displays as shown in FIG. 9 the indices ('D1', 'D2', 'D4', . . . ) chosen as described above, with a choice mark 38 (icon of a car in the example shown in FIG. 9) (FIG. 3, step S4).

As shown in FIG. 9, the choice marks 38 are displayed on a choice mark display area provided near the indices (for example "sell my car at a high price" displayed on the division area 32).

The CPU 42 of the server computer 4 monitors through the Internet 8 whether or not the cursor (not shown) is brought to another one of themes displayed on the second display area 26 of the CRT 64 of the personal computer 6 (FIG. 3, step S5). The CPU 42 controls to maintain the current state of the displayed choice mark 38 unless the cursor is brought to another theme.

When the user of the personal computer 6 brings the cursor to another theme, for example "want to buy a used car" (theme 'T2'), the information is transmitted through the Internet 8 to the server computer 4.

The CPU 42 of the server computer 4, on the basis of the transmitted information, moves the control process to the step S3 of FIG. 3. That is, it searches through the relation table 18 shown in FIG. 7, and chooses indices 'D3', . . . provided with the theme 'T2' (FIG. 3, step S3), displays as shown in FIG. 10 the chosen indices 'D3', . . . with a choice mark 38 attached (FIG. 3, step S4).

In this way, every time the cursor is brought to a different theme, an index corresponding to that theme is displayed with the choice mark 38 attached.

Figure 4:
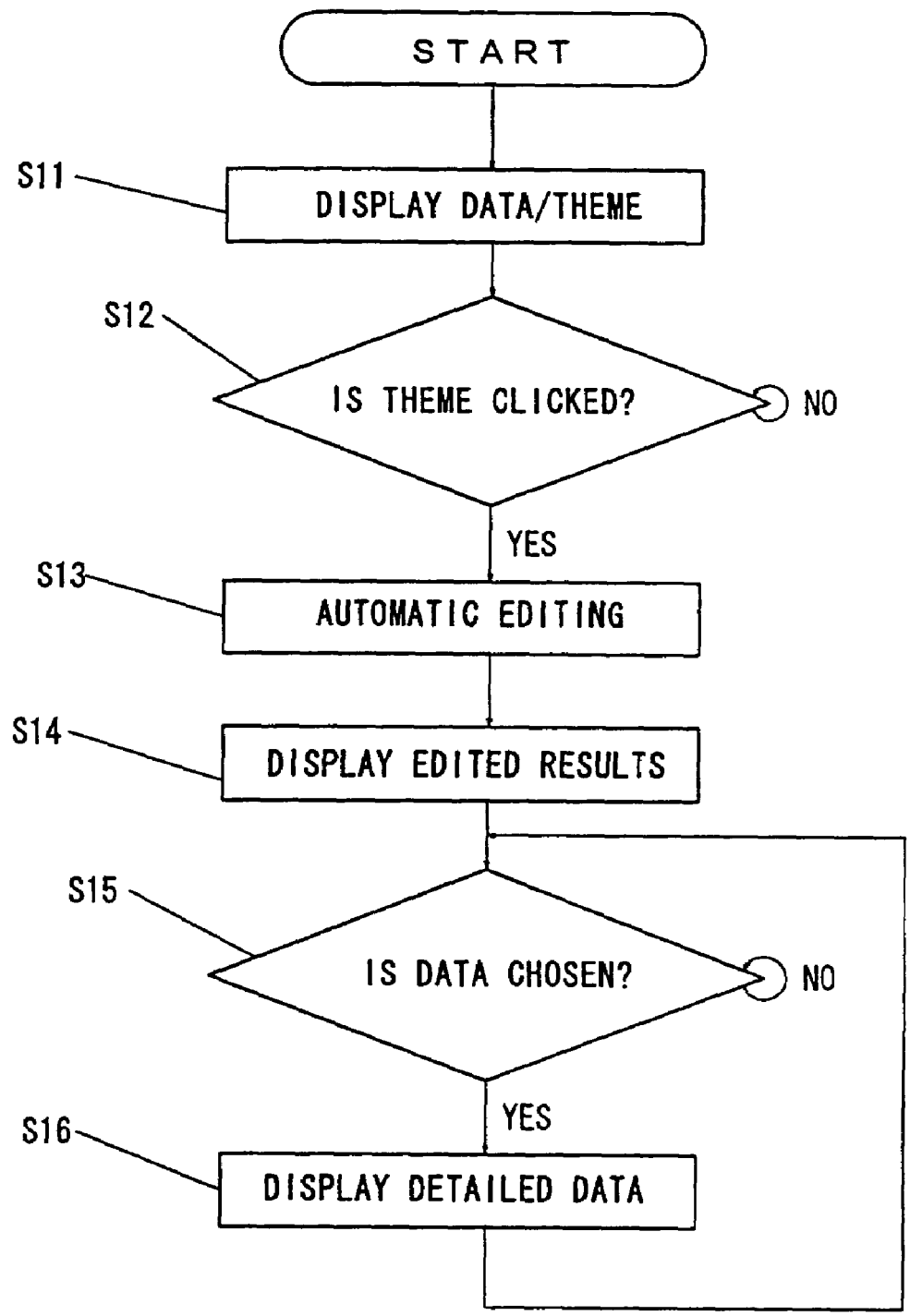
FIG. 4 is a flowchart of an example of process of editing and displaying data (an automatic editing process) on the first display area 24 on the CRT 64 of the personal computer 6 of the display control system 2.

Next, another process with this display control system 2 is explained. FIG. 4 is a flowchart of an example process of editing and displaying data (an automatic editing process) on the first display area 24 on the CRT 64 of the personal computer 6 of the display control system 2.

Figure 13:
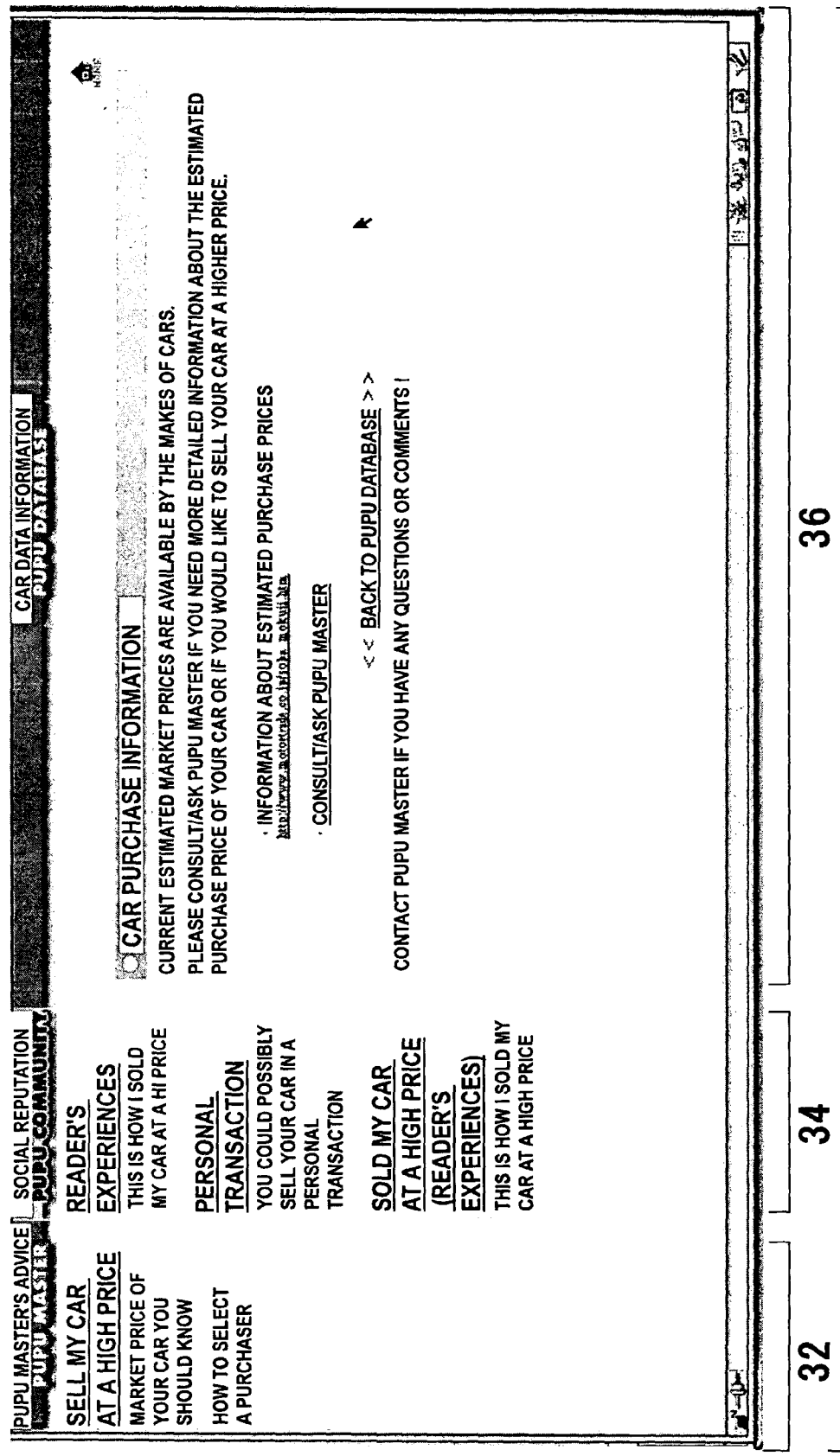
FIG. 13 shows an example image displayed on the CRT 64 of the personal computer 6 in the automatic editing process.

FIGS. 11 to 13 show example images displayed on the CRT 64 of the personal computer 6 in the automatic editing process.

The automatic editing process is described in reference to FIGS. 2, 4 to 7, and 11 to 13. The step S11 of FIG. 4 is similar to the step S1 of FIG. 3. Namely, in the step S11, the displayed state of the CRT 64 of the personal computer 6 becomes as shown in FIG. 8.

In this state, the CPU 42 of the server computer 4 monitors through the Internet 8 whether or not any theme displayed on the second display area 26 of the CRT 64 of the personal computer 6 has been clicked (FIG. 4, step S12).

When the user of the personal computer 6 clicks any theme, such as "want to sell my car" (theme ID 'T1'), this information is transmitted through the Internet 8 to the server computer 4.

The CPU 42 of the server computer 4, based on the information transmitted, carries out automatic editing (FIG. 4, step S13) as described below.

First, the CPU 42 of the server computer 4, based on the information transmitted, searches through the relation table 18 shown in FIG. 7 to choose indices 'D1', 'D2', 'D4', . . . provided with the theme 'T1'.

Next, the CPU 42 of the server computer 4 determines the display priority degrees of the chosen indices 'D1', 'D2', 'D4', . . . in the division areas 32, 34, and 36. The display priority degrees are determined by comparing the theme relation degrees in the relation table 18 shown in FIG. 7.

In this example, as seen from the data file 14 of FIG. 5, for example the indices 'D2' and 'D4' belong to the same information field 'F2'. Also as seen from the relation table 18 shown in FIG. 7, the theme relation degrees of the indices 'D2' and 'D4' for the theme 'T1' are '40' and '60', respectively.

Therefore, in the second division area 34 corresponding to the information field 'F2', the index 'D4' is higher in display priority degree than the index 'D2'. That is to say, the index 'D4' is to be displayed in a higher position than the index 'D2' in the second division area 34.

Next, the CPU 42 determines the display area size of the division areas 32, 34, and 36. This embodiment is arranged, when any theme displayed on the second display area 26 is clicked, to increase the area size of the first division area 32 constituting the first display area 24 to be greater than that of the second division area 34 and the third division area 36.

This embodiment is also arranged, when any theme displayed on the second display area 26 is clicked, to display more detailed data (namely the information related to the chosen information) about the index related to the first division area 32 constituting the first display area 24.

Next, the CPU 42 displays through the Internet 8 the results of automatic editing described above on the CRT 64 of the personal computer 6 (FIG. 4, step S14). FIG. 11 shows an example of the automatically edited results displayed on the CRT 64 of the personal computer 6.

At this time as shown in FIG. 11, the second display area 26 is not provided on the CRT 64 of the personal computer 6 to maximize the first display area 24.

Next, the CPU 42 of the server computer 4 monitors through the Internet 8 whether or not any theme displayed on the first display area 24 of the CRT 64 of the personal computer 6 has been clicked (FIG. 4, step S15).

When the user of the personal computer 6 clicks for example "personal transaction" displayed on the second division area 34 constituting the first display area 24, this information is transmitted through the Internet 8 to the server computer 4.

The CPU 42 of the server computer 4, based on the information transmitted, displays detailed data about the "personal transaction" in the second division area 34 as shown in FIG. 12 (FIG. 4, step S16).

At this time, it is arranged to increase the size of the second division area 34 to be greater than that of the first division area 32 and the third division area 36. In this way, the area for displaying more detailed data about the index "personal transaction" is favorably secured.

Next, the CPU 42 of the server computer 4 changes the control back to the step S15 of FIG. 4 to monitor whether or not any index displayed on the first display area 24 of the CRT 64 of the personal computer 6 has been clicked.

For example, if the "car purchase information" displayed on the third division area 36 constituting the first display are 24 is clicked in that state, namely in the state shown in FIG. 12, the state of the CRT 64 of the personal computer 6 changes to the state as shown in FIG. 13.

Incidentally, while this embodiment is described as an example in which a theme is clicked in the state of the step 11 or the state shown in FIG. 8, the automatic editing related to the present invention is not limited to the above example.

For example, the automatic editing may also be applied to the case of clicking a theme or index in the state shown in FIG. 9. That is to say, when the "want to sell my car" (theme 'T1') displayed on the second display area 26 is clicked, the process from the step S13 on of FIG. 4 is carried out, and an image shown in FIG. 11 is displayed on the CRT 64 of the personal computer 6.

Also for example, when the index "personal transaction" displayed on the second division area 34 constituting the first display area 24 is clicked in the state shown in FIG. 9, the process from the step S16 of FIG. 4 is carried out, and an image shown in FIG. 12 is displayed on the CRT 64 of the personal computer 6.

The display screen of this embodiment is arranged to take any hierarchical structure. For example, when part of the detailed data displayed on the first division area 32 is clicked in the displayed state of FIG. 11 (for example "(1) market price of your car you should know"), further detailed explanation about "(1) market price of your car you should know" (information related to the chosen information) is displayed on the first division area 32 (not shown).

As described above, this embodiment is arranged to affix the choice mark 38 to only the data, of the plural data displayed simultaneously on the first display area 24, chosen according to the choice instruction entered. Therefore, any person who wants to view data can easily find the data related to the choice instruction out of a large number of data by simply entering the choice instruction. Namely, intended data related to the choice instruction may be easily found.

This embodiment is also arranged that, of the plural data, only the data chosen according to the choice instruction entered are displayed on the first display area in the order of display priority degrees. Therefore, any person who wants to view specific data can easily find the data related to the choice instruction out of a large number of data by simply entering the choice instruction. Namely, intended data related to the choice instruction may be easily found.

Incidentally, while the above embodiment is described as an example of displaying the information on cars, application of the present invention is not limited to displaying the car information but may be to any displaying information in general.

While the above embodiment is arranged to choose the data corresponding to a certain theme by providing in advance the relation between the theme and data in the form of the table shown in FIG. 7 for example, the method of determining the theme to data relation is not limited to the above.

For example, it may be arranged to subject data and/or theme to various methods of sentence analysis, on the basis of the analysis results, to calculate the corresponding relation between themes and data, and to choose data corresponding to a certain theme according to the calculated relationship.

While the car icon as an example is used as a choice mark in the above embodiment, the choice mark is not limited to that as a matter of course. Also, while the choice mark is displayed on the choice mark display area provided near the data, the choice mark may be displayed on any other position.

While the above example is provided with the choice mark and the data, the function of the choice mark may be replaced by other methods, for example by changing the color of data display, using different font of characters or bold characters, so that they stand out.

While data are displayed in the above embodiment from top toward bottom on the display screen according to the display priority degrees, the present invention is not limited to the above. For example, the data may be displayed from left to right on the display screen according to the display priority degrees.

It may also be arranged to display data with time intervals on the display screen according to the display priority degrees. For example, it may be arranged that data of a highest display priority degree is displayed first on the display screen, followed by data of a second highest priority degree, and data of the lowest display priority is displayed last.

While the above embodiment is arranged to determine the display priority degrees of data by providing in advance the theme relation between the theme and data in the form of the table shown in FIG. 7 for example, the method of determining the display priority degrees is not limited to the above.

For example, it maybe arranged to subject data and/or theme to be displayed to various methods of sentence analysis, on the basis of the analysis results, to calculate the theme-to-data relation degrees (theme relation degrees), and to determine the display priority degrees according to the calculated theme relation degrees.

Furthermore, the display priority degrees may be determined, for example, according to the Japanese syllabary or in the order of data entry, irrespective of the theme-to-data relation degrees.

The above embodiment is described as an example in which entry of the information choice instruction is made by sliding the cursor to the displayed information (theme or data) or by clicking the displayed information. However, the method of entering the information choice instruction is not limited to the above.

For example, the present invention may also be applied to the case in which the information choice instruction is entered through a keyboard or by voice. In that case, it is not always necessary to store or display information that constitutes the second group of items of information.

However, displaying the information constituting the second group of items of information is convenient for users because users can easily choose specific piece of information to be chosen from displayed pieces of information.

The above block diagrams, hardware constitution, flowcharts, data structures, tables, display screens, etc. are mere examples and the present invention is not limited to those items enumerated above.

Also the number of tables is not specifically limited. The process of using tables may also be carried out using algorithm instead as described above.

The above embodiment is arranged with the server computer 4 storing the system program and data to control the personal computer 6 through the Internet 8. However, the present invention is not limited to that arrangement.

For example, it is possible to make the personal computer 6 have part of the program and data of the system. As a matter of course, plural computers may be used as server computers. In that case, such computers may be interconnected through a communications network such as the Internet.

While the above embodiment is described as an example in which the Internet is used as a communications network, the network is not limited to the Internet. For example, this invention may be applied to other network such as a LAN (local area network) through which the server computer and terminal devices such as personal computers are interconnected.

Furthermore, this invention is not limited to the case in which more than one computers are interconnected through a communications network. For example, this invention may also be applied to the case of using a standalone computer.

In this embodiment, it is assumed to install the program of this system in the hard disk and run. However, the means for holding the program is not limited to the above. For example, the program of this system may also be recorded on a CD-ROM, a flexible disk, or a magnetic tape.

Furthermore, the program of this system may also be distributed through wired or wireless communications network. Besides, it is also possible to install the program of this system in a main server computer to make a local server computer run the program of this system through a network such as the Internet.

Furthermore, the manner of recording programs and data are not specially limited. In addition to recording in the form ready to run, recording may be made in the compressed form to be decompressed and run.

While the above embodiment is described as an example realizing various functions shown in FIG. 1 using computers, part of the functions of FIG. 1 may be constituted with hardware logic.

The display control system, the display control device, the recording medium with a program recorded therein, and the display control method according to the present invention are characterized by being controlled such that plural items of information that constitute a first group of items of information are recorded and held, plural items of information constituting the first group of items of information recorded and held are read and displayed simultaneously in a first display area, one or more items of information constituting the first group of items of information are chosen on the basis of an information choice instruction entered, and the items of information chosen out of the items of information displayed on the first display area are provided with a choice mark and displayed.

In other words, of the plural items of information displayed simultaneously on the first display area, only those chosen on the basis of a choice instruction entered are provided with a choice mark. Therefore, one who wants to view information can easily find the information related to the choice instruction by simply entering the choice instruction. Namely, an intended piece or pieces of information related to the choice instruction can be easily viewed.

The display control system, the display control device, the recording medium with a program recorded therein, and the display control method according to the present invention are characterized by being controlled such that plural items of information that constitute a first group of items of information are recorded and held, one or more items of information constituting the first group of items of information are chosen on the basis of an information choice instruction entered, and the one or more items of information chosen are displayed on the first display area according to predetermined display priority degrees.

In other words, of the plural items of information, only those chosen on the basis of the choice instruction entered are displayed on the first display area according to predetermined display priority degrees. Therefore, one who wants to view information can easily find the information related to the choice instruction by simply entering the choice instruction. Namely, an intended piece or pieces of information related to the choice instruction can be easily viewed.

In the display control device and the recording medium having recorded a program according to the present invention, a memory means further stores plural items of information that constitute the second group of items of information and that are made to correspond, in a predetermined corresponding relation, to plural items of information that constitute the first group of items of information. It is also characterized by being controlled such that plural items of information constituting the second group of items of information are read from a memory means and displayed simultaneously in the second display area of the display means, one of plural items of information constituting the second group of items of information is chosen according to an information choice instruction entered through an input means, one or more items of information constituting the first group of items of information made to correspond in a predetermined corresponding relation is or are chosen on the basis of the chosen one item of information, and the items of information chosen out of those displayed on the first display area are displayed with a choice mark attached.

In other words, in the second display area are displayed the items of information of the second group of items of information made to correspond in the predetermined corresponding relation to the plural items of information constituting the first group of items of information. Therefore, one who wants to view information can easily find the information related to the chosen one of the large number of items of information constituting the first group of items of information by simply entering an information choice instruction by choosing one of plural items of information displayed on the second display area.

The display control device and the recording medium having recorded a program according to the present invention are characterized by being controlled such that when the cursor of the display means is slid to one of plural items of information constituting the second group of items of information displayed on the second display area of the display means, that item of information is deemed to have been chosen, items of information displayed on the first display area corresponding to the item of information to which the cursor is slid are provided with a choice mark and displayed, and the currently displayed choice marks remain displayed until the cursor is slid to another item of information in the second group of items of information.

Therefore, one who wants to view information can easily view the information related to the information to which the cursor is slid by a simple operation of sliding and matching the cursor. Besides, as the currently displayed choice marks remain displayed until the cursor is slid and pointed to another item of information, the related information may be confirmed any time even if the cursor is left intact for an elongated period of time.

In the display control device and the recording medium having recorded a program according to the present invention, a memory means further stores plural items of information that constitute the second group of items of information and that are made to correspond, in a predetermined corresponding relation, to plural items of information that constitute the first group of items of information. It is also characterized by being controlled such that plural items of information constituting the second group of items of information are read from a memory means and displayed simultaneously in the second display area of the display means, one of plural items of information constituting the second group of items of information is chosen according to an information choice instruction entered through an input means, one or more items of information constituting the first group of items of information made to correspond in the predetermined corresponding relation is or are chosen on the basis of the chosen one item of information, and the one or more items of information are displayed on the first display area of the display means.

That is to say, in the second display are displayed the second group of items of information that are made to correspond in specified corresponding relation to the plural items of information constituting the first group of items of information. Therefore, one who wants to view information can easily view, by simply choosing one of plural items of information displayed on the second display area and entering the information choice instruction, only the information that is related to the choice instruction out of a large number of items of information constituting the first group of items of information.

The display control device and the recording medium having recorded a program according to the present invention are arranged with a memory means provided with a table having recorded the corresponding relation between items of information constituting the first group of items of information and items of information constituting the second group of items of information. It is also characterized in that one or more items of information constituting the first group of items of information corresponding to the one item of information chose in the second group of items of information is or are chosen on the basis of the table.

Therefore, the corresponding relation between the items of information constituting the first group of items of information and the items of information constituting the second group of items of information can be easily described by the use of the above table even if the corresponding relation is complicated.

The display control device and the recording medium having recorded a program according to the present invention are arranged with a memory means provided with a table having recorded the display priority degrees of respective items of information constituting the first group of items of information on the first display area for respective items of information constituting the second group of items of information. It is also characterized in that the display priority degrees of one or more items of information constituting the first group of items of information corresponding to the one item of information chosen in the second group of items of information are determined on the basis of the table.

Therefore, the display priority degrees of each item, on the first display area, of information constituting the relevant first group of items of information can be easily described using the above table for each item of information constituting the second group of items of information. Therefore, plural items of information in the first group of items of information related to a certain item of information in the second group of items of information may be easily displayed on the first display area in the order of priority degrees for example from top toward bottom or from right to left.

The display control device and the recording medium having recorded a program according to the present invention are characterized by being controlled such that, when an item of information constituting the first group of items of information displayed on the first display area of the display means is chosen, items of information that are related to the chosen item of information are displayed.

Therefore, it is possible for example to restrict the explanation of items of information constituting the first group of items of information to a limited extent while giving detailed explanation of the related items of information. In this way, the limited space of the first display area is efficiently used to transmit information. In other words, by restricting the display of the information constituting the first group of items of information to a limited extent of explanation, a large number of items of information can be displayed on the first display area. When any item of information is chosen from those items of information, now a wider space on the first display area becomes available for more detailed explanation related to the chosen item of information.

The display control device and the recording medium having recorded a program according to the present invention are arranged with a memory means having recorded the items of information constituting the first group of items of information or the items of information related to that information in a state that can be divided into plural fields of information. It is also characterized by being controlled such that the fist display area of the display means is divided into plural areas corresponding to the plural fields of information, and the items of information in the corresponding fields of information or related items of information are displayed respectively in the divided areas.

Therefore, items of information constituting the first group of items of information or items of information related to that items of information can be divided into plural fields of information, and displayed dividedly according to the division on the first display area. In this way, information may be recognized for each field of information. In other words, intended information related to the choice instruction may be more easily recognized.

The display control device and the recording medium having recorded a program according to the present invention are characterized by being controlled such that items of information are displayed, in a state to be chosen, in the divided first display area and that, when an item of information displayed on the first display area is chosen, the display area size of the divided area containing the chosen item of information becomes larger than the display area size of other divided areas.

Therefore, it is possible for example to restrict the information constituting the first group of items of information to the extent of a simple explanation and display a large number of items of information on the first display area.

When any item of information is chosen from them, now a wider space can be secured for more detailed explanation of the information related to the chosen item of information. In this way, the limited space for the first display area is efficiently used to transmit information.

The display control device and the recording medium having recorded a program according to the present invention are characterized by being constituted that a terminal computer having an input means and a display means, and a server computer that has a memory means and controls to display information on the display means of the terminal computer according to a program, may be interconnected through a communications network.

Therefore, it is possible, when the Internet is used as a communications network for example, to create Web pages that make it possible to view intended information easily.

While the present invention is described above as preferable embodiments, the wording is meant not to be restrictive but illustrative, and may be changed without departing from the scope and spirit of the present invention, within the scope of appended claims.

The invention claimed is:

1. A display control system comprising:
an input means through which an information choice instruction is entered,
a display means for displaying information,
a display control means for controlling the display means to display information according to the information choice instruction entered through the input means, and
a memory means for storing plural items of information that constitute a first group of items of information, wherein
the display control means controls to read plural items of information constituting a first group of items of information from the memory means, to simultaneously display the read items of information in a first display area of the display means, to choose one or more of plural items of information constituting the first group of information according to the information choice instruction entered through the input means, and to attach a choice mark to the items of information chosen out of the items of information displayed on the first display area,
wherein the memory means stores and holds, in a state divisible into plural information fields, information that constitutes or is related to the first group of items of information,
the display control means controls to divide the first display area of the display means into plural areas corresponding to the plural information fields, and to display in the respective, divided areas the information on or related to the corresponding information fields, and
wherein the display control means controls to display items of information, in a state to be chosen, in the divided first display area and, when an item of information displayed on the first display area is chosen, to make the display area size of the divided area containing the chosen item of information larger than that of other divided areas.

2. A display control device for controlling to display information using a display means according to an information choice instruction entered through an input means, comprising:
a memory means for storing plural items of information constituting a first group of items of information, and a display control means for controlling to read from the memory means plural items of information constituting the first group of items of information, to display the items of information simultaneously in a first display area of the display means, to choose one or more items of information constituting the first group of items of information according to the information choice instruction entered through the input means, and to attach a choice mark to the items of information chosen out of the items of information displayed on the first display area,
wherein the memory means stores and holds, in a state divisible into plural information fields, information that constitutes or is related to the first group of items of information,
the display control means controls to divide the first display area of the display means into plural areas corresponding to the plural information fields, and to display in the respective, divided areas the information on or related to the corresponding information fields, and
wherein the display control means controls to display items of information, in a state to be chosen, in the divided first display area and, when an item of information displayed on the first display area is chosen, to make the display area size of the divided area containing the chosen item of information larger than that of other divided areas.

3. A display control device according to claim 2, wherein
the memory means further stores plural items of information that constitute a second group of items of information and that are made to correspond in specified corresponding relation to the plural items of information constituting the first group of items of information,
the display control means further controls to read plural items of information constituting the second group of items of information from the memory means and display them simultaneously in a second display area of the display means, to choose one of plural items of information constituting the second group of items of information according to the information choice instruction entered through the input means, to choose one or more items of information constituting the first group of items of information made to correspond in a predetermined corresponding relation on the basis of the chosen one item of information, and
to attach a choice mark to the items of information chosen out of the items of information displayed on the first display area.

4. A display control device according to claim 3, wherein
the display control means controls,
when the cursor of the display means is slid to one of plural items of information constituting a second group of items of information displayed on a second display area of the display means, to deem the one item of information to have been chosen, to attach a choice mark to the items of information out of those displayed on the first display area and corresponding to the one item of information to which the cursor is slid, and to maintain the choice mark currently displayed until the cursor is slid to another of the second group of items of information.

5. A display control device according to claim 3, wherein
the memory means comprises a table having stored corresponding relation between the items of information constituting the first group of items of information and the items of information constituting the second group of items of information, and the display control means chooses one or more items of information constituting the first group of items of information corresponding to one item of information chosen from the second group of items of information on the basis of the table.

6. A display control device according to claim 2, wherein the display control means controls, when an item of information constituting the first group of items of information displayed on the first display area of the display means is chosen, to display items of information related to the chosen one item of information.

7. A display control device according to claim 2, wherein the display control device is a server computer connectable through a communications network to a terminal computer comprising the input means and display means.

8. A recording medium on which is recorded a program, the program for causing a computer system, made up of an input means for entering an information choice instruction, a display means for displaying information, and a memory means for storing plural items of information constituting a first group of items of information, to perform controlling process of displaying information on the display means according to the information choice instruction entered through the input means, wherein the controlling process comprising the steps of: reading from the memory means plural items of information constituting a first group of items of information, displaying the plural items of information simultaneously on a first display area of the display means, choosing one or more items of information constituting the first group of items of information according to the information choice instruction entered through the input means, and attaching a choice mark to the items of information chosen out of the items of information displayed on the first display area, wherein the memory means stores and holds, in a state divisible into plural information fields, the information that constitutes or is related to the first group of items of information, the program controls to divide the first display area of the display means into plural areas corresponding to the plural information fields, and to display on the respective, divided areas information of corresponding information fields or information related to the information, and wherein the program controls to display items of information, in a state to be chosen, on the divided first display area and, when an item of information displayed on the first display area is chosen, to make the display area size of the divided area containing the chosen item of information larger than that of other divided areas.

9. A recording medium on which is recorded a program according to claim 8, wherein the memory means further stores plural items of information that constitute the second group of items of information and that are made to correspond in a specified corresponding relation to plural items of information constituting the first group of items of information, the program further controls to read plural items of information constituting the second group of items of information from the memory means and display simultaneously on the second display area of the display means, to choose one of plural items of information constituting the second group of items of information according to the information choice instruction entered through the input means, to choose one or more items of information constituting the first group of items of information made to correspond in a predetermined corresponding relation on the basis of the chosen one item of information, and to attach a choice mark to the items of information chosen out of the items of information displayed on the first display area.

10. A recording medium on which is recorded a program according to claim 9, wherein the program controls, when the cursor of the display means is slid to one of plural items of information constituting the second group of items of information displayed on the second display area of the display means, to deem the one item of information to have been chosen, to attach a choice mark to the items of information out of those displayed on the first display area and corresponding to the one item of information to which the cursor is slid, and to maintain the choice mark currently displayed until the cursor is slid to another of the second group of items of information.

11. A recording medium on which is recorded a program according to claim 9, wherein the memory means comprises a table storing corresponding relation between the items of information constituting the first group of items of information and the items of information constituting the second group of items of information, and the program, on the basis of the table, chooses one or more items of information constituting the first group of items of information and corresponding to the one item of information chosen out of the second group of items of information.

12. A recording medium on which is recorded a program according to claim 8, wherein the program, when one item of information constituting the first group of items of information displayed on the first display area of the display means is chosen, controls to display items of information related to the chosen one item of information.

13. A recording medium on which is recorded a program according to claim 8, wherein the computer system is a system constituted with a terminal computer comprising the input means and display means, and a server computer that comprises the memory means to control and display the information on the display means of the terminal computer on the basis of the program, with both of the computers interconnected through a communications network.

14. A display control method for controlling to display information on a display means according to an information choice instruction entered, arranged for controlling to store and hold plural items of information constituting a first group of items of information, to read the plural items of information constituting the first group of items information stored and held, to display the items of information simultaneously on a first display area of the display device, to choose one or more items of information constituting the first group of items of information according to the entered information choice instruction, and to attach a choice mark to the items of information chosen out of the items of information displayed on the first display area, to store and hold information that constitutes or is related to the first group of items of information in a state divisible into plural information fields, to divide the first display area of the display device into plural areas corresponding to the plural information fields, and to display in the respective, divided areas the information on or related to the corresponding information fields, and to choose in a state to be chosen, in the divided first display area, an item of information displayed on the first display area, and to make the display area size of the divided area containing the chosen item of information larger than that of other divided areas.

* * * * *